US006064463A

United States Patent [19]

Yamada et al.

[11] Patent Number: 6,064,463

[45] Date of Patent: May 16, 2000

[54] DEVELOPING APPARATUS USING ONE-COMPONENT TONER

[75] Inventors: Masanori Yamada, Ikoma; Takayuki Yamanaka, Tenri; Toshihiko Takaya; Tadashi Iwamatsu, both of Nara; Atsushi Inoue, Ikoma-gun; Nobuyuki Azuma, Ibaraki; Keiji Yasuda, Nishinomiya; Kazuhiro Matsuyama, Ikoma; Hiroshi Tatsumi, Shiki-gun, all of Japan

[73] Assignee: Sharp Kabushiki Kaisha, Osaka, Japan

[21] Appl. No.: 09/204,811

[22] Filed: Dec. 3, 1998

[30] Foreign Application Priority Data

Dec. 5, 1997 [JP] Japan .................................... 9-335394

[51] Int. Cl.[7] ........................... G03B 27/32; G03B 27/52; G03G 15/08

[52] U.S. Cl. ................................ 355/27; 355/40; 399/284

[58] Field of Search ......................... 355/27, 40; 396/608; 399/274, 284

[56] References Cited

U.S. PATENT DOCUMENTS 4,766,468 8/1988 Hosono et al. ......................... 399/234
5,373,353 12/1994 Fukasawa ................................ 399/284
5,552,867 9/1996 Sekino et al. ........................... 399/284

FOREIGN PATENT DOCUMENTS 60-15068 4/1985 Japan .
7-64391 3/1995 Japan .
7239611 9/1995 Japan .

*Primary Examiner*—Safet Metjahic
*Assistant Examiner*—Hung Henry Nguyen
*Attorney, Agent, or Firm*—Renner, Otto, Boisselle & Sklar LLP

[57] ABSTRACT

A blade is pressed against a developing roller for regulating the amount of toner which is deposited on a surface of the developing roller. The blade is formed with a slant face at its tip end, to which the toner is transported along a direction of rotation of the developing roller. An angle of aperture $\theta$ at a toner inlet portion defined by the developing roller and the slant face is set at 12.5° or more, the angle of aperture counting in an angle $\psi$ of the slant face, elastic deformation and radius (R) of the developing roller, and an angle $\alpha$ related to a nip width w on which the blade contacts with the developing roller. Such an angle of aperture $\theta$ provides a great allowance for a free length l of the blade, thereby permitting the blade to maintain a constant toner mass for forming a uniform toner layer.

19 Claims, 5 Drawing Sheets

DEVELOPING APPARATUS USING ONE-COMPONENT TONER

BACKGROUND OF THE INVENTION

1. Field of the Invention

The present invention relates to a developing apparatus using toner which is a colorant for developing an electrostatic latent image formed on an image bearing member into a visible image, more particularly, to a developing apparatus using a one-component developer as the toner.

2. Description of the Related Art

Electrophotographic image forming apparatuses, such as copiers, printers and the like, include a developing apparatus which is adapted to form an electrostatic latent image on a photosensitive member serving to bear the latent images, to supply a developer, such as toner which is a colorant, and to make the toner deposit selectively, thereby making the latent image visible.

In the above-mentioned developing apparatus, a latent image formed on the photosensitive member is developed into a toner image which is transferred to a transfer medium such as a shoot. After the image transfer, a part of the toner that was not transferred to the sheet remains on a surface of the photosensitive member. The remaining toner is removed from the surface of the photosensitive member so that the photosensitive member is prepared for the subsequent image forming operation. To this end, a cleaner unit is provided for removing the residual toner from the photosensitive member surface after transfer operation. The toner thus removed by the cleaner unit is received by a toner chamber in the cleaner unit.

Image forming apparatuses with a developing apparatus arranged above mentioned have been faced with a demand for downsizing. To meet this demand, reduced are spaces for various processing means which are located around the photosensitive member and involved in the image forming process. The reduced spaces for the processing means result in a further demand for downsizing the respective processing means themselves. In this connection, a strong demand exists for a compact developing apparatus.

Specifically, as to the developing apparatus, a developing roller of a magnetic brush type is provided which utilizes a magnetic force for supplying a two-component developer composed of toner particles and a magnetic carrier to a developing region in opposing relation with the photosensitive member, and every time the development operation completes, a residual developer is recovered to a developing tank. Hence, control is provided for stable developing performance such that toner of consumed amount may be made up thereby to maintain a constant concentration of toner or content ratio of the toner in the developer.

Generally, the developing apparatus of the above-mentioned type, namely of the magnetic brush type tends to have a large overall size because the developer contains a greater proportion of carrier and requires a large developing tank for storage of the developer. In addition to the need for controlling the toner concentration, a stirring member or the like is needed for maintaining a constant charge of the toner particles in the developer. A plurality of stirring members provided in the developing apparatus constitutes a bottleneck in the downsizing of the developing apparatus.

On the other hand, a developing apparatus using a one-component developer or carrier-free toner has been proposed and put to practical use. Such a one-component toner developing apparatus permits the size reduction thereof because the control of toner concentration is not necessary and the absence of carriers permits the reduction of capacity of the developing tank. In addition, such a developing apparatus features easy maintenance. More specifically, the developing apparatus eliminates the need for a maintenance work for replacing a deteriorated developer particularly resulting from deteriorated carriers.

Further, the developing apparatus only needs the replenishment of toner, obviating the necessity of sensing the toner concentration. Inasmuch as control for sensing the toner concentration is not necessary, simple control may be provided. Particularly, the developing apparatus using the one-component toner only needs the replenishment of toner when required.

In the developing apparatus utilizing one-component toner, the toner must be supplied to and made to deposit on the developing roller. In the case the single-component toner is magnetic toner, the developing roller imparted with a magnetic force is capable of magnetically attracting a desired amount of toner thereby forming thereon a toner layer of a uniform thickness. However, in order to impart the magnetic force to the developing roller, the developing roller need to be constructed such that a plurality of magnets are disposed along a direction of rotation while an outer periphery of the arranged magnets are covered with a non-magnetic cylindrical sleeve. As a result, the apparatus tends to be increased in size.

Compared to this, in the case of a developing apparatus utilizing non-magnetic one-component toner, the developing roller is formed of an elastic material such as rubber, not relying on the magnetic force for attracting the toner. Accordingly, the developing roller may have a simple structure and a reduced diameter, thus permitting the weight reduction. However, since the developing roller is not adapted to magnetically attract the toner, an important point is to bring a constant amount of toner or a uniform toner layer into contact with the photosensitive member.

To this end, a feed roller is provided with respect to the developing roller, while a blade is provided so as to be pressed against the developing roller for regulating the toner mass per unit area, thereby maintaining the thickness of fed toner constant. The blade is typically configured so that a face of a sheet-like member constituting the blade is press contacted at a suitable pressure. The amount of toner supplied to the developing roller is regulated by suitably pressing the surface or belly of the sheet-like blade member against the developing roller whereby a uniform toner layer is formed on an overall axial area of the developing roller.

An alternative method wherein an end or edge of the blade rather than the face thereof is pressed against the roller has been proposed in Japanese Examined Patent Publication JP-B2 60-15068(1985).

In these known blade structures, when the blade is pressed against the developing roller at its face of belly, is wherein the face or belly of the blade is pressed against the developing roller, the toner fusion may be advantageously prevented. Unfortunately, however, when toner of a good fluidity is employed for good toner feeding to the developing roller, the blade needs to be pressed against the roller at an increased pressure for accomplishing an optimum toner mass per unit area for the developing process. This results in an increased driving torque of the developing roller, thus requiring a large driving motor.

Although a uniform toner layer of a very small thickness may be formed by pressing the tip end or edge of the blade against the roller, a sufficient amount of toner for the developing process may not be achieved.

The regulation of the toner mass per unit area may be accomplished by adjusting the setting position of the blade under the condition including both conditions of pressing the surface or belly of the blade against the roller and pressing the tip end or edge of the blade against the roller. This permits formation of a suitable toner layer which is constant in thickness and sufficient in quantity for performing the developing process under suitable conditions. Unfortunately, however, this arrangement provides little allowance for the setting position of the blade, resulting in a very difficult adjustment of the setting position of the blade. Furthermore, serious variations in the toner mass per unit area depositing on the roller are caused by wear or the like of the blade so that increased frequencies of the blade replacement result. In addition, each blade replacement involves a very cumbersome adjustment work, thus lowering the serviceability.

Aside from the aforementioned blades, there is known a blade in which an end portion of the blade is shaped like "L" in section such that a bent thereof is pressed against the developing roller. This blade offers a benefit that the amount of toner may be regulated under an intermediate condition between the aforesaid conditions of pressing the end or edge of the blade and of pressing the belly or face of the blade.

Unfortunately, when this blade is pressed against the roller at its bent, a curvature of the bent thereof is varied to cause significant variations in the toner mass per unit area. Hence, the bent must be formed with an extremely high precision. This means a demanding work for fabricating the blade.

A method for stabilizing the toner mass per unit area on the developing roller has been disclosed in Japanese Unexamined Patent Publications JP-A 7-64391(1995) and JP-A 7-239611(1995). According to this method, a tip end of the blade is slightly angled for attaining a desired toner mass per unit area. This method contributes to an increased allowance for the setting position of the blade, thus negating the need for the exacting adjustment work.

The developing apparatus disclosed in Japanese Unexamined Patent Publication JP-A 7-64391(1995) or the like provides an increased allowance for the setting position of the blade serving to maintain a constant amount of toner which is deposited on the developing roller and ensures stable toner feeding.

In actual apparatuses set forth in the above publication, however, an angle of aperture of a toner inlet portion defined by the blade and the developing roller is varied due to deformation of the developing roller or difference in diameter of the developing rollers. This may lead to serious variations in the toner mass per unit area deposited on the developing roller, although the blade is set to position according to predetermined conditions. The deformation of developing roller means that the developer roller is elastically deformed by pressing the blade against the roller. The difference in the diameters of the developing rollers is attributable to variations in the size of respective rollers generated in fabrications or difference in the type of the developing apparatuses.

Accordingly, if an allowance for setting is insufficient because of problems regarding the angle of aperture defined by the tilt angle of the slant face formed in the blade or the bending angle of the blade is reduced due to the aforementioned causes, then the cumbersome adjustment work becomes necessary. That is, a need exists for reworking the end portion of the blade according to each developing roller thereby to provide a sufficient allowance for the setting position of the blade. In other words, a specific blade having a slant face conforming to each developing roller must be fabricated. This leads to cumbersome operations for fabricating the blades which are required of high precision.

The angle of aperture of the toner inlet portion defined by the developing roller and the blade is not taught in Japanese Unexamined Patent Publications JP-A 7-64391(1995) and JP-A 7-239611(1995).

There is another problem regarding a case where the blade is mechanically bent for forming the slant face thereof. That is, distortion due to residual stress caused by the bending of the blade impairs the straightness of the blade so that the blade becomes incapable of forming the uniform toner layer along the axial direction of the developing roller. In a case where the blade is formed of a rolled material, the distortion is further increased due to the residual stress produced in the rolling process so that the straightness of the blade is impaired similarly to the aforesaid case. As a result, the blade becomes incapable of forming the uniform toner layer along the axial direction of the developing roller.

In the generally known blades formed of a metal sheet, a metal material having a good resilience, such as phosphor bronze, stainless steel and the like, is used rather than aluminum and the like which has a relatively poor resilience. The blade formed of such a material suffers the toner fusion to the surface thereof if it is used over an extended period of time. The toner fused to the blade causes variations in the thickness of the toner layer with respect to the axial direction of the developing roller, and production of partial streaks results. If the developing roller in this state is used for developing the latent image, a degraded image and the like result.

SUMMARY OF THE INVENTION

In view of the foregoing, it is an object of the invention to provide a developing apparatus using one-component toner, in which a determined toner mass per unit area is ensured and a uniform toner layer is formed by using a blade, whereby a uniform toner layer can be formed without being affected by elastic deformation of a developing roller.

It is another object of the invention to provide a developing apparatus in which a sheet thickness and a material of a blade is suitably selected for reducing an influence of distortion due to a residual stress generated in a mechanical bending process, thereby ensuring a straightness of the blade and permitting formation of a toner layer having a favorable thickness on the entire axial area of a developing roller.

It is still another object of the invention to provide a blade in which a direction of a bending line relative to a rolling direction of a rolled material used for the blade is specified or a suitable heat treatment is applied so as to reduce an influence of a distortion of rolling essentially possessed by the rolled material, thereby ensuring a straightness of the blade and achieving a favorable toner thickness on the entire axial area of a developing roller.

It is yet another object of the invention to provide a blade in which an occurrence of crack at a contact surface with the developing roller is prevented by a suitable technique or cracks on the contact surface after processing are removed. thereby obtaining a favorable toner thickness.

It is further another object of the invention to provide a developing apparatus provided with a blade having a slant portion which is readily formed with a higher precision than a mechanical bending process.

According to a first aspect of the invention, a developing apparatus using one-component toner comprises:

a developing roller for carrying and transporting one-component toner to a developing region opposing to an image bearing member bearing an electrostatic latent image; and a blade for regulating an amount of one-component toner carried on the developing roller, wherein the blade pressed against the developing roller is formed with a slant face at a tip end thereof, the slant face being inclined so that a distance between the slant face and the developing roller is gradually reduced along a direction of incoming toner, and an abutment force of the blade and a tilt angle of the slant face of the blade are set so that an angle of aperture θ between the slant face and the developing roller in a state of being pressed against the blade is equal to or more than 12.5°.

Specifically, a blade 25 for regulating the toner mass per unit area is pressed against a developing roller 21 at a suitable abutment force, as shown in FIG. 1. At this time, the abutment of the blade 25 causes deformation of the developing roller 21. In this state, the toner is introduced to a nip portion on which the blade 21 contacts with the developing roller 21. The slant face 25*a* or the like of the blade 25 is adjusted so that the blade 25 and the developing roller 21 in a deformed state may form an angle of aperture θ of equal to or more than 12.5° at a toner inlet portion through which toner flows into a nip portion where the blade 21 contacts with the developing roller 21. In this case, the angle of aperture θ counting the elastic deformation of the developer in is set to the aforesaid condition rather than setting a tilt angle ψ of the slant face 25*a* of the blade 25. This ensures that a stable toner mass per unit area and a uniform thickness of toner layer regardless of variations of elastic coefficient and diameter of the developing roller. Particularly, a sufficient allowance for the setting position of the blade is ensured by setting the angle of aperture θ at a toner inlet portion to a given value with the slant face of the blade and the elastic deformation of the developing roller taken into consideration. This eliminates the need setting a specific angle of the slant face of the blade according each developing roller.

According to a second aspect of the invention, a developing apparatus of the above configuration is characterized in that the angle of aperture θ is set by setting a radius R of the developing roller and a tilt angle ψ at the tip end of the blade so as to satisfy $0-\psi+\sin^{-1}(w/2R)$ where ψ denotes a tilt angle of the slant face of the blade, w denotes a nip width on which the blade contacts with the developing roller, and R denotes a radius of the developing roller. This eliminates the need for varying the slant face of the blade in conjunction with variation in the diameter of the developing roller and also provides a sufficient allowance for the setting position of the blade. Hence, a low-cost developing apparatus is offered.

According to a third aspect of the invention, a developing apparatus of the above configuration is characterized in that the blade is constructed of a one-piece metal sheet-like member formed with the slant face by mechanical bending, and that a thickness of the sheet-like member is not more than 0.2 mm. Such a blade suffers less distortion due to the residual stress, thus maintaining the straightness thereof. Hence, the blade is capable of stabilizing the toner mass per unit area on the developing roller thereby forming a uniform toner layer.

According to a fourth aspect of the invention, a developing apparatus of the above configuration is characterized in that the slant face of the blade is formed by bending the sheet-like member constructing the blade along a bend line orthogonal to a rolling direction of the sheet-like member. This is also effective to eliminate the influence of distortion due to the residual stress so that the slant face formed by bending is permitted to maintain the straightness thereof adequately. Thus, a more preferable toner layer is formed.

In this connection, even when the slant face is manufactured by bending process while specifying a material such as quality of the sheet-like member constructing the blade, sufficient straightness may be ensured. Specifically, there may be used a sheet-like member of SUS 301-CSP set forth in JIS G 4313 subjected to a temper of ¾H or EH, or of SUS 304-CSP subjected to a temper of ¾H or H, thereby to maintain an adequate straightness of the blade which is one of factors for forming a uniform toner layer. In the case where the blade is formed of a rolled material, and straightness of the blade cannot be attained because of a large distortion of the residual stress in rolling process, the stock may be subject to the TA (tention annealing) treatment.

According to a fifth aspect of the invention, a developing apparatus of the above configuration is characterized in that the mechanical bending for forming the slant face of the blade is carried out by using a mold provided with a projection at a position corresponding to a bend position on a side of the blade opposite to a side thereof abutting with the developing roller. The developing apparatus may be provided with the blade fabricated in this manner, with the result that a problem caused by cracks in the blade is eliminated. Thus, a uniform toner layer may be obtained.

According to a sixth aspect of the invention, a developing apparatus of the above configuration is characterized in that a side face abutting with the developing roller of the blade is ground. This eliminates surface roughness due to cracks, thereby ensuring forming of a uniform toner layer.

According to a seventh aspect of the invention, a developing apparatus of the above configuration is characterized in that alumite-treated aluminum foil is provided on at least a face of the blade which is on a side abutting with the developing roller. This prevents the toner from being fused to the blade and the developing roller, thereby ensuring forming of the uniform toner layer over an extended period of time.

According to an eighth aspect of the invention, a developing apparatus of the above configuration is characterized in that the slant face of the blade is formed by making a step at a tip end of a sheet-like member constructing the blade, and thereafter sticking a metal foil piece so as to cover the step. As shown in FIG. 9 for example, a metal foil piece 255 is stuck to a member 254 constructing the blade 25 so as to cover a step 25*c* formed in the blade member 254 including a portion contacting with the developing roller. This permits the metal foil piece 255 to define the slant face 25*a* over the step 25*c*. In this case, there exists no influence of distortion due to the residual stress because mechanical bending is not performed. Hence, the straightness of the slant face is not impaired and therefore, the slant face is formed with a high precision. This permits the forming of a further improved toner layer. It is to be noted that the step may be formed by an etching process or the like and a depth or the like of the step may be arbitrary set.

According to a ninth aspect of the invention, a developing apparatus of the above configuration is characterized in that the blade is formed of two thin-sheet members stacked together with tip ends thereof being shifted from each other for forming the step, and the metal foil piece is provided so as to cover the step. As shown in FIG. 10 for example, the step 25*c* is formed by stacking two blade members 256, 257 together which members are shifted from each other. In this structure, the depth of the step 25*c* may be readily set to an arbitrary value by selecting and controlling the thickness of one of the blade member 256. Further, the lengths of the shifted end portions of the two blade members may readily be set to specified values. For instance, the length of the step portion may be defined with quite a high precision by cutting off the tip end of the longer blade member. In addition, the length of the step portion may be defined with a high precision by providing positioning portions in the two blade members.

For forming the slant face precisely, a metal foil piece 258 stuck on the step portion may have a thickness of 0.05 mm or less. Alumite-treated aluminum foil used for the metal foil piece 258 will effectively prevent the toner fusion.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
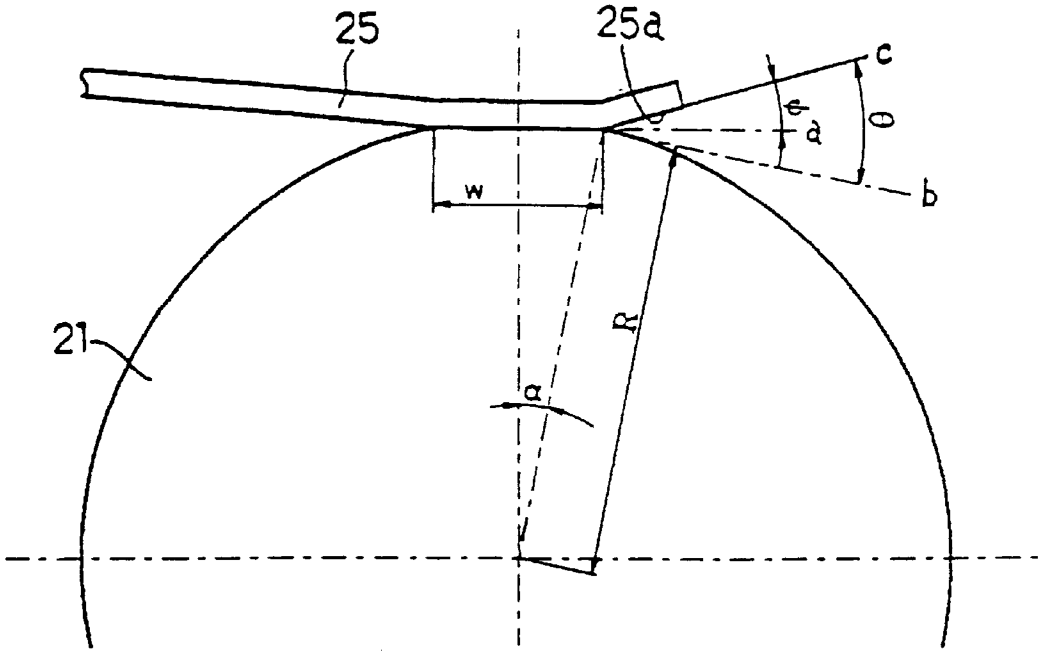
FIG. 1 is a schematic diagram showing a relation between a developing roller and a blade which compose a developing apparatus using one-component toner according to one embodiment of the invention.

Now referring to the drawings, preferred embodiments of the invention are described below.

Figure 2:
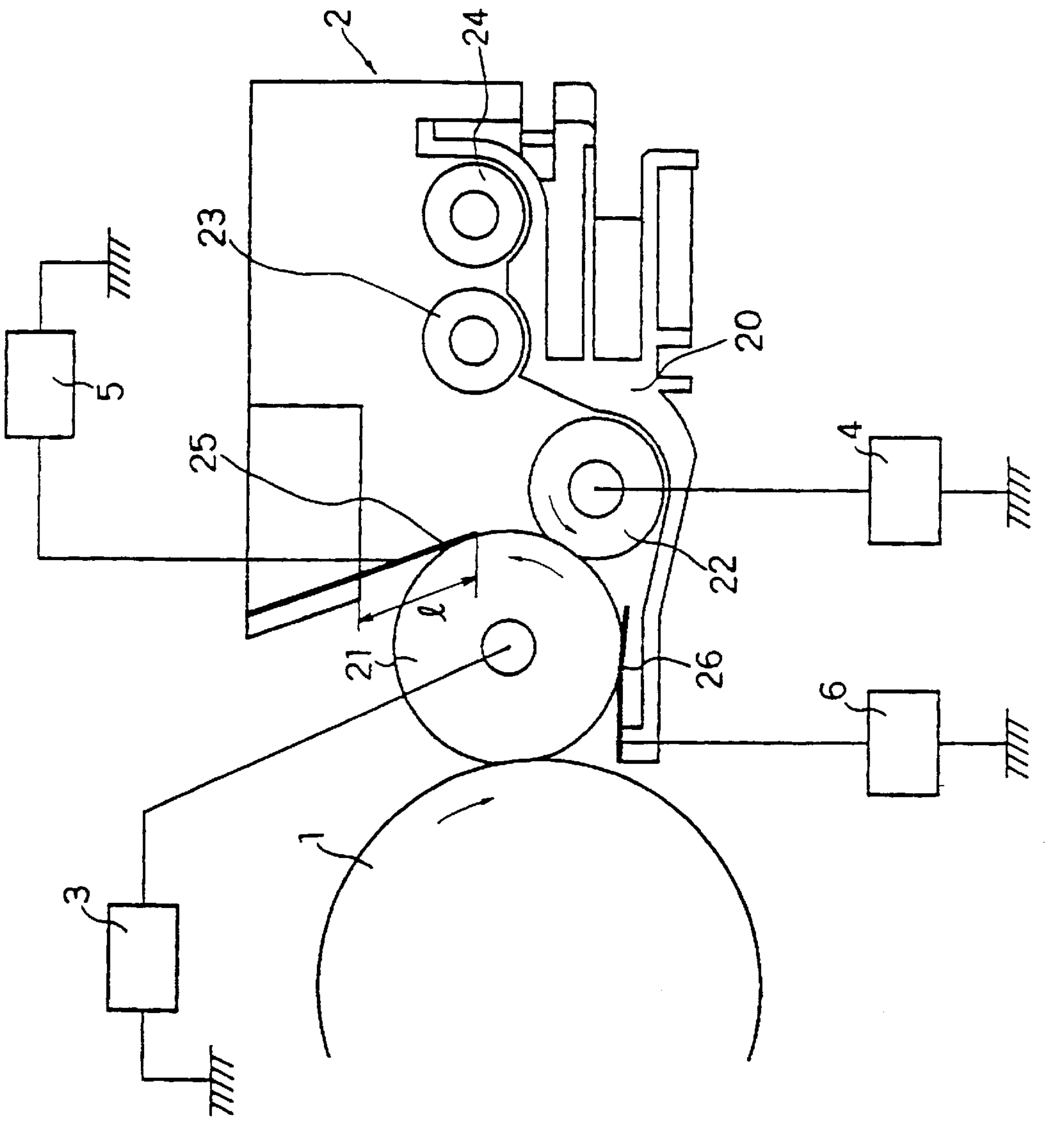
FIG. 2 is a schematic diagram for illustrating the developing apparatus using one-component toner according to the invention and a constitution of an image forming station in a state that an electrostatic latent image formed on a photosensitive member or a latent image bearing member is developed by the developing apparatus.

The developing apparatus of the present invention will be described with reference to FIGS. 1 and 2. FIG. 1 illustrates in detail a state where a developing roller and a blade constituting the developing apparatus of the invention, contact with each other, the developing apparatus being opposed to a photosensitive member which serves especially as an image bearing member of an image forming apparatus. FIG. 2 is a diagram showing a configuration of an image forming station, particularly a developing station of the image forming apparatus equipped with the developing apparatus of the invention.

Hereunder, a schematic configuration of the image forming apparatus will be described with reference to FIG. 2. A photosensitive member 1 composing a drum-like carrier is disposed almost in the center of the image forming apparatus and rotated at a fixed speed in the direction of the arrow when an image forming operation is performed. The carrier is used to carry a static latent image thereon. Various image forming process means are disposed around this photosensitive member 1 so as to be opposed thereto respectively.

The above image forming process means include a charger that charges the surface of the photosensitive member 1 in uniform (not shown); an optical system that irradiates an image based on light according to the image (not shown); a developing apparatus 4 of the invention, used to visualize a static latent image formed on the surface of the photosensitive member 1 after being exposed by the optical system; a transfer member for transferring a developed image (toner image) onto a sheet-like paper fed as needed (not shown); a cleaning member for removing residual developer (toner) remained on the surface of the photosensitive member 1 after the transfer process is ended (not shown); and an eliminator for eliminating electric charge remained on the surface of the photosensitive member 1 (not shown), etc., which are all disposed in order in the rotating direction of the photosensitive member 1.

Many sheets of paper are stacked in, for example, a tray or a cassette. A sheet of paper is then fed by a paper feeding means into the transfer area opposed to the photosensitive member 1, where the above-mentioned transfer member is disposed. At this time, the sheet is fed so as to be aligned to the tip at the toner image formed on the surface of the photosensitive member 1. The sheet, after the image is transferred, is separated from the photosensitive member 1, then fed into a fixing apparatus.

The fixing apparatus fixes a non-fixed toner image transferred onto a sheet of paper as a permanent image. The fixing apparatus has a heat roller heated up to a temperature for fusing toner and fixing the toner image on its surface opposed to the toner image. The fixing apparatus also includes a pressure roller pressed against the heat roller and used to make the sheet come in contact closely with the heat roller. The sheet passing through this fixing apparatus is ejected outside the image forming apparatus, into an ejection tray (not shown) via an ejection roller.

The optical system (not shown) irradiates light on a copy original and outputs reflecting light from the original as a light image if a copying machine is used as an image forming apparatus. If a printer or a digital copying machine is used as an image forming apparatus, the optical system turns on/off the semiconductor laser thereby to output a light image according to image data. Especially, when a digital copying machine is used as an image forming apparatus, the optical system including the semiconductor laser receives image data obtained by reading the reflecting light from a copy original using an image read sensor (CCD element, etc.) and outputs a light image according to the image data. If a printer is used as an image forming apparatus, the optical system receives image data from another processing apparatus, for example, a ward processor, a personal computer, etc. and converts the data to a light image according to the image data and outputs the light image. Not only a semiconductor laser, but also an LED element, a liquid crystal shutter, etc. are usable for converting image data to a light image.

If an image forming operation is started in the image forming apparatus as described above, the photosensitive member 1 is rotated in the direction of an arrow and the surface of the photosensitive member 1 is charged by the charger to a potential of a specific polarity in uniform. After this charging process, the optical system (not shown) outputs a light image, so that a static latent image is formed on the surface of the photosensitive member 1 according to this light image. This static latent image is developed in the developing apparatus in the next stage thereby to visualize the static latent image artificially. One-component toner is used for this developing process in the invention. The toner is sucked selectively by, for example, an electrostatic force onto a static latent image formed on the surface of the photosensitive member 1 so as to be developed.

The transfer member disposed in the transfer area then transfers the toner image developed on the surface of the photosensitive member 1 as described above statically on a sheet fed synchronously with the rotation of the photosensitive member 1 as needed. In this transfer process, the transfer member charges the back side of the sheet to a polarity opposite to the polarity of charged toner, so that the toner image is transferred onto the sheet.

After this transfer process is ended, part of the toner image that has not been transferred onto the surface of the photosensitive member 1 remains and this residual toner is removed by the cleaning member from the surface of the photosensitive member 1. Then, the surface of the photosensitive member 1 is eliminated to a uniform potential, for example, almost 0 potential by the eliminator thereby to reuse the photosensitive member 1.

On the other hand, the sheet, after the transfer process is ended, is separated from the photosensitive member 1 and fed to the fixing apparatus. In this fixing apparatus, the toner image on the sheet is fused, then pressed and fixed due to a pressure generated between rollers. Passing this fixing apparatus, the sheet is ejected as an image formed sheet onto a tray provided outside the image forming apparatus.

Next, the developing apparatus of the invention will be described with reference to FIGS. 1 and 2. In other words, detailed description will be made for the developing apparatus of the invention, which uses one-component toner.

At first, a configuration of the developing apparatus using one-component toner will be described with reference to FIG. 2. The developing apparatus 2 comprises a developing roller 21 provided rotatably in a developing tank 20 containing one-component toner, for example, non-magnetic one-component toner; a feed roller 22 for feeding one-component toner to the developing roller 21; and two screw rollers 23, 24 on the right side of the developing tank 20 in Figure, for feeding one-component toner supplied as needed to the developing tank 20.

The developing roller 21 is provided in the developing tank 20 so as to be partly exposed from the tank and to be rotated in the same direction as the photosensitive member 1 at a developing region for transporting the toner to the developing region where the developing roller 21 opposes the photosensitive member 1. Pressed against the developing roller 21 is the aforesaid feed roller 22.

The developing roller 21 has a configuration in which, for example, a surface of a metal roller is coated with a porous, elastic material such as sponge. If carbon-distributed macromolecular foam polyurethane, etc. or ion conductive solid rubber is used as the elastic member such as sponge, a predetermined resistance value that prevents toner fusion can be kept and it will function effectively when developing bias voltage is supplied to the developing roller.

The developing roller 21 is supplied with a developing bias voltage from a developing bias supply 3. The developing bias voltage is set to a polarity and value such as to cause the toner to deposit on the static latent image on the photosensitive member 1 but not on the other region thereof or a non-image region.

The feed roller 22 is rotated so that a rotation direction thereof is opposite to that of the developing roller 21 at an opposing region of the feed roller 22 and the developing roller 21. The feed roller 22 is formed of a similar material to that of the developing roller 21, and the electric resistance thereof may be adjusted by using similar resistance adjusting materials. Further, in order to increase the elasticity, the feed roller 22 is formed of foamed materials, which contains larger amount of foaming agent than the material for the developing roller.

To the feed roller 22, a bias voltage is applied from a bias supply 4, which bias voltage is set generally so that the toner is pushed to the developing roller 21, and in a direction that the toner on the feed roller 22 is repelled, allowing the toner to be fed to the developing roller 21. In the case where negative-polarity toner is used, for example, a bias voltage is applied to the feed roller 22 smaller than the bias voltage to the developing roller 21.

The developing roller 21 and the feed roller 22 are connected to drive motors (not shown), and each of the rollers is rotated in a direction of an arrow in Figure, thereby permitting the feed roller 22 to feed the toner to the developing roller 21 and to separate (remove) the toner remaining on the surface of the developing roller 21 after the developing process is performed. The toner thus feed by the feed roller 22 is deposited on the surface of the developing roller 21, and prior to being transported to the developing region opposing to the surface of the photosensitive member 1, the toner mass per unit area is regulated to a predetermined thickness by a blade 25 which is suitably pressed against the developing roller for regulating the toner mass per unit area.

The blade 25 is pressed against the developing roller 21 at a suitable pressure. The blade 25 is composed of a blade member formed of a sheet-like metal material, a belly (face) in the vicinity of the tip end thereof being pressed against the developing roller 21. Thus, the toner fed to the developing roller 21 is so regulated as to have a predetermined charge and thickness according to a predetermined pressure and position of the blade 25. Subsequently, the toner so regulated is transported to the developing region where the developing roller opposes the photosensitive member 1.

Also to the blade 25, a predetermined voltage is applied from a bias supply 5. Likewise, the bias voltage to the blade 25 is set to cause the toner to be pressed to the developing roller 21. In the case where negative-polarity toner is used, for example, a bias voltage to is applied to the blade 25 smaller than the bias voltage to the feed roller 22. Further, the bias voltage to be applied to the blade 25 may be set to the same potential as that applied to the developing roller 21.

By the way, the toner transported to the developing region opposing to the photosensitive member 1 is selectively deposited on the surface of the photosensitive member 1 according to a static latent image formed thereon, and makes the static latent image apparent by virtue of colors of the toner. The toner not used for the image development is returned to the developing tank 20 by the rotation of the developing roller 21. At a place where the toner is returned, a charge removing member 26 for toner is provided so as to be pressed against the developing roller 21. The charge removing member 26 is located upstream the feed roller 22 in the rotating direction of the developing roller 21, and one end thereof is fixed to the developing tank 20 while an free end thereof is pressed against the developing roller 21 by virtue of the elasticity of the charge removing member 26. As a result, the charge removing member 26 is suitably pressed against the developing roller 21.

Charges of the toner not having used for developing are eliminated by the charge removing member when the toner is returned to the developing tank 20 by the rotating developing roller 21 and then the toner is to be recycled. Also to the charge removing member 26, a charge eliminating voltage for removing the charge from the toner is applied from a power source 6.

In this manner, the developing apparatus 2 transports the toner to the developing region where the developing apparatus 6 opposes the photosensitive member 1, thereby developing the latent image on the surface of the photosensitive member 1 into a visible image. The resultant toner image on the surface of the photosensitive member 1 is transferred onto a sheet fed to an image transfer region as needed, which sheet subsequently passes through the fixing apparatus and be ejected from the the image forming apparatus.

Incidentally, as the photosensitive member 1, an OPC photosensitive member or the like comprises: a conductive base formed of metal or resin on the surface of which an under layer is applied; a carrier generating layer (CGL) laid over the under layer; and a carrier transfer layer (CTL) defining an outermost layer and principally composed of polycarbonate. It is to be understood that the invention is not limited to such a photosensitive member but applicable to any carries capable of bearing electrostatic latent images.

Structure of the Developing Roller

Although the description was already made for the developing roller 21, the structure thereof will be explained in detail hereunder.

The developing roller 21 includes a core bar (shaft) formed of a metal or a low-resistance resin material, and an elastic member having a relative dielectric constant of about 10 and covering the core bar. The elastic member covering the surface of the developing roller 21 is preferably formed of the following materials: a material based on a dispersion-type resistance adjusted resin in which conductive fine particles as an electrical resistance adjusting material, for example, either or both of carbon and $TiO_2$ (titanium oxide) are mixed and dispersed in a resin selected from the group consisting of EPDM, urethane, silicone, nitrile-butadien rubber, chloroprene rubber, styrene-butadiene rubber, butadiene rubber and the like; and a material based on an electric resistance adjusting resin in which an ionic conductive material, one or more of inorganic ionic conductive materials selected from the group consisting of sodium perchlorate, calcium perchlorate, sodium chlorite and the like are added to the resin selected from the group consisting of EPDM, urethane, silicone, nitrile-butadien rubber, chloroprene rubber, styrene-butadiene rubber, butadiene rubber and the like. As a foaming agent, if used in a foaming/mixing process for obtaining elasticity of the elastic member, silicone surfactants, such as polydiallylsiloxane and polysiloxanpolyalkyne oxide block copolymer are preferably used.

As one example of the foam molding process, an example of a hot blow foam molding includes the steps of mixing the above-mentioned material in suitable proportions, agitating the resultant mixture by a mixer/injector, introducing the mixture into an injection-extrusion mold, heating the mixture at a temperature of between 80° C. and 120° C., and injecting the molded stock. A preferred heating time ranges from about 5 to 100 minutes.

In a case where the elastic member is integrally molded with a core bar by injection molding, an integrally molded part may be obtained by placing a conductive metal core bar (shaft) at the center of a preliminarily prepared mold, introducing the mixture into the mold similarly to the above-mentioned example, and heating and vulcanizing the mixture for a period ranging from about 10 to 160 minutes.

As the carbon black included in the electric resistance adjusting materials, carbon black (e.g., ISAF, HAF, GPF, SRF and the like) having a nitrogen absorption specific surface area of 20 $m^2/g$ or less is used, and the carbon black is mixed with polyurethane in a ratio of 0.5 to 15 parts by weight (about 70 parts in some instances) per 100 parts by weight of polyurethane.

Examples of the polyurethane include a soft polyurethane foam and a polyurethane elastomer. Besides, the aforesaid EPDM, urethane, silicone, nitrile-butadiene rubber, chloroprene rubber and butadiene rubber may be used.

In the case where the developing roller 21 is formed of a material based on EPDM instead of a material based on polyurethane, the EPDM which contains ethylene, propylene and a third component such as dicyclopentadiene, ethylidene norbornene, 1.4-hexadiene is preferably formed by mixing ethylene, propylene and a third component in proportions of 5 to 95 parts by weight, 5 to 95 parts by weight, and 0 to 50 parts by weight based on iodine value, respectively. In addition, to achieve a satisfactory dispersibility, a suitable amount of a carbon black to be mixed is 1 to 30 parts by weight per 100 parts of EPDM. As described in the foregoing, examples of usable carbon black include ISAF, HAF, GPF, SRF and the like.

In combination with carbon black or a resistance adjusting material, as a resistance adjusting base material, ionic conductive materials such as sodium perchlorate, tetraethylammonium chloride, or surfactants such as dimethyl polysiloxane, polyoxyethylene lauryl ether may be used in a ratio of 0.1 to 10 parts by weight per 100 parts by weight of EPDM for further improving the dispersibility and homogeneity.

Examples of the above ionic conductive materials include inorganic ionic conductive materials such as sodium perchlorate, calcium perchlorate, sodium chloride, and organic ionic conductive materials such as modified aliphatic acid dimethylammonium ethosulfate, stearylammonium acetate, laurylammonium acetate, octadecyl trimethylammonium perchlorate and the like. Such materials may be used alone or in combination or plural materials.

Structure of Blade Serving as Toner Thickness Regulating Member

As shown in FIG. 2, the blade 25 has its one end fixed to the developing tank 20 by a predetermined length while having its free end with a free length which is not fixed but is pressed against the developing roller 21 at a suitable pressure. Particularly, one end of the blade 25 is fixed to the developing tank 20 so that it is pressed against the developing roller 21 by virtue of its own resilience.

As shown in FIG. 1, the blade 25 is bend-processed in such a direction that the tip end thereof is spaced away from the surface of the developing roller 21. An angle of aperture O defined by the developing roller 21 and the bent blade 25 is set to a value which will be described below. At this time, the developing roller 21 is elastically deformed due to pressure contact with the blade 25 and is contacting with the blade along a nip width w. Thus, a toner mass per unit area is regulated by the rotation of the developing roller 21 at the contact region between the developing roller 21 and the blade 25, whereby the toner layer is formed in a constant thickness.

The blade 25 is formed of a blade member composed of a metal sheet having a thickness within the range from 0.05 to 0.2 mm. The blade 25 has one fixed end, which permits the above-mentioned press contact with the developing roller 21 at a suitable pressure by utilizing resilience as well as elastic deformation of the metal sheet. This ensures a regulation for making a thickness of toner on the developing roller 21 constant.

Furthermore, the tip end of the blade 25 thus which is pressed against the developing roller 21 as shown in FIG. 1 has a slant face 25*a* which is slightly angled away from the developing roller 21, so as to form an angle of aperture θ gradually increasing relative to the developing roller 21. In order to form the slant face 25*a*, the tip end of the blade 25 is subject to a bending process, for example. The process will be described in detail hereinafter.

As a material for forming the blade 25, materials having resilience is generally used. Examples of such materials include spring steels such as SUS; stainless steels such as SUS301, SUS304, SUS420J2, SUS631; and copper alloys such as C1700, C1720, C5210, C7701.

Structure of the Charge Removing Member

Referring to FIG. 2, the charge removing member 26 removes charge from the residual toner in direct contact with the toner while being pressed against the developing roller 21, and then separates the toner from the developing roller 21 for recycle use. Alternative to such a charge removing method, there is known a method in which a corona discharger is used for charge removing, and a contact-type toner separating rotary member is provided for separating toner from the developing roller 21 for recycle use.

For the charge removing member 26 shown in FIG. 2, used is a sheet-like elastic member which is pressed against the developing roller 21 at a suitable pressure as in the case of the blade 25, and to which a voltage is applied by the power source 6 for removing charge from the toner returned after the developing process. Thus, the elastic member is composed of a base material (main component) such as nylon, PET (polyethylene terephthalate), PTFE (polytetrafluoroethylene), and polyurethane, and an electrical resistance adjusting material such as carbon for obtaining a suitable electrical resistance. The charge removing member 26 having such a resistance is supplied with the charge removing voltage by the source 6.

For the carbon black used as an electrical resistance adjusting material, carbon blacks having a nitrogen absorption specific surface area within the range from 20 $m^2/g$ to 130 $m^2/g$, for example furnace blacks or channel blacks such as ISAF, HAF, GPF and SRF are used. A mixing ratio of the carbon black is equal to or more than 10 parts by weight (in some cases, equal to or less than 70 parts by weight) per 100 parts by weight of polyurethane (ditto for nylon, PET and other resins).

One-Component Toner

The toner which is a one-component developer is prepared by mixing 80–90 parts by weight of styrene-acryl copolymer 5–10 parts by weight of carbon black and 0–5 parts by weight of a charge control agent, and pulverizing the resultant mixture, thereafter classification is executed so as to obtain negative-charge toner particles having a mean particle size of about 5 to 10 μm. In order to improve fluidity, 0.5 to 1.5 parts by weight of silica ($SiO_2$) is mixed with the toner particles or the toner particles are coated with silica. Thus non-magnetic one-component toner is obtained.

The toner is not limited to the negative-charge type but also positive-charge toner may be used. The positive-charge toner may readily by prepared by suitably selecting a binder resin which is a main component, a charge control agent and the like. Such toner is not only applicable to the black toner for use in monochromatic copying machines and printers but also to color toner for use in color copiers and printers.

The non-magnetic one-component toner is not limited to the one having above-mentioned composition but toners having compositions which will described below are applicable to the developing apparatus of the invention.

As a binder resin which is a main component, thermosetting resins, such as polystyrene, polyethylene, low molecular weight polypropyrene, epoxy resins, polyamide, and polyvinyl butyral besides styrene-acryl copolymer may be used.

As a colorant for use in black toner, besides the aforesaid carbon black, furnace black, nigrosine dyes, metal-containing dyes and the like may be used. As colorants for use in color toner, yellow colorants such as benzidine-based yellow pigments, phenon yellow, insoluble acetoacetanilide-based azo pigments, monoazo pigments, azomethine pigments; magenta colorants such as xanthene-based magenta dyes, tungsten molybdate lake pigments, anthraquinone dyes, coloring materials including xanthene dyes and organic carboxylates, thioindigo, insoluble naphthol-based azo pigments; and cyan colorants such as copper phthalocyanine-based pigments may be used.

Further, as a fluidizing agent for toner, besides silica which is applied as a coating agent, colloidal silica, titanium oxide, alumina, zinc stearate, polyvinylidene fluoride and a mixture thereof may be used.

Still further, as a charge control agent for negative-charge toner, azo-containing dyes, organometallic complexes, chlorinated paraffin and the like may be used. As a charge control agent for positive-charge toner, on the contrary, nigrosine dyes, metallic salts of aliphatic acids, amine, quarternary ammonium salts and the like may be used.

In the developing apparatus 2 using the aforesaid one-component toner, the blade 25 pressed against the developing roller 21 serves to regulate the toner mass per unit area on the developing roller for maintaining a constant thickness of the formed toner layer. At this point, in order to expand an allowance for attaching and fixing the blade 25 to the developing tank 20, the angle of aperture θ which is formed by the slant face 25*a* provided in the blade 25 in the invention and a tangent line at a point where blade 25 is pressed against the developing roller 21 and the toner flows between thereof becomes important. The angle of aperture θ is set to 12.5° or more, as will be described in detail in the following working examples. This angle of aperture θ depends not only on the tilt angle of the slant face 25*a* but also on a condition of the developing roller 21 when it is pressed against the blade 25, as shown in FIG. 1.

In the following Examples, effects of setting the angle of aperture θ, defined by the slant face 25*a* on the tip end of the blade 25 at a predetermined value or more were confirmed, in the case of the above-described one embodiment including the structure of the blade 25 for permitting the one-component toner to deposit uniformly on the developing roller 21.

EXAMPLE 1

The developing apparatus 2 used in Example 1 has the configuration as shown in FIG. 2. The conductive substrate of the photosensitive member 1 is grounded and the photosensitive layer surface is uniformly charged at a potential of, for example, −550 V. The photosensitive member 1 has a diameter of 65 mm and rotates in a direction of the arrow at a peripheral velocity of 190 mm/sec.

The conductive, elastic developing roller 21 having a diameter of 27 mm (radius R=13.5 mm) is formed of a conductive urethane rubber to which a conductizing agent such as carbon black is added, and which has a volume resistivity of about $10^6$ Ωcm, an Alkar C hardness of 60 to 70 degree based on JIS K 6301 and a mean center-line roughness Ra of about 1.0 μm based on JIS B0601. The developing roller 21 is rotated in a direction of an arrow shown in the figure at a peripheral velocity of 285 mm/sec. The developing roller 21 is supplied with a developing bias voltage of −450 V by the developing bias supply 3 via a rotary shaft having a diameter of 15 mm. The developing roller 21 is pressed against the photosensitive member 1 via a toner layer in such a manner that the developing roller 2 contacts with the photosensitive member 1 along a development nip (developing region) of 2 mm.

The feed roller 22 serving to agitate the toner and to remove the residual toner from the developing roller 21 after developing process has a diameter of 20 mm and is formed of a conductive urethane foam having a volume resistivity of $10^5$ Ωcm and a cell density of about 3 cells/mm. The feed roller 22 is pressed against the developing roller 22 at a contact depth of 0.5 mm and rotated in a direction of an arrow shown in the figure at a predetermined peripheral velocity of 170 mm/sec. The feed roller 22 is supplied with a bias voltage of −550 V by the bias supply 4 via a stainless steel shaft of the feed roller 22.

As shown in FIG. 2, the blade 25 for regulating the thickness of the toner layer on the developing roller 21 is formed of a 0.1 mm-thick stainless steel sheet, having a centilever structure in which one end thereof is fixed. The blade was biased at 550 V by the bias supply 5. The blade 25 is supplied with a bias voltage of −500V by the bias supply 5. The blade serves to regulate the toner mass per unit area (m/a) on the developing roller 21 to about 0.8 to 1.0 mg/cm$^2$ and the toner charge (q/m) to about −10 μC/g.

Although not shown in FIG. 2, the developing roller 21 and the blade 25 are provided with a seal at opposite ends thereof for prevention of toner spill. The seal is formed of a 0.1 mm-thick PET film. As required, the seal may employ an aluminum-deposited film or the like for conductivity, a potential of which is set to the same or higher −50 V or so than that of developing roller 21. A conductive surface of such a seal may be abutted against the developing roller 21 for removing the charge from the toner.

An effective roller resistance r of the developing roller 21 and a developing current 1 flowing during developing process generate a voltage drop Vd=i·r in the developing roller 21. The developing bias voltage effectively affecting the surface of the developing roller 21 may be lowered by getting the effective roller resistance r at a suitable value, thereby adjusting a sharp gradient binary-like developing characteristics into a predetermined gradient for improving gradation characteristics.

Further referring to FIG. 1, the blade 25 for regulating the thickness of the toner layer will be described in detail.

The blade 25 is fixed to the developing tank 20, and pressed against the surface of the developing roller 21 at a free length portion l where the blade is not restricted by the fixed end thereof, at a predetermined pressure f of about 30 gf/cm, the free length portion freely extended from the fixed end of the blade as defining a curve of cubic function. The blade 25 cooperates with the developing roller 21 to charge the toner and form a thin layer of toner at a contact region therebetween accounting for a nip width w which is defined by an abutment pressure f of the blade 25 and a radius and elasticity of the developing roller 21.

An angle α formed between a straight line connecting a center of the nip width w and a center of the developing roller 21 and a straight line connecting an end point of the nip width w and the center of the developing roller 21 can be geometrically found from FIG. 1. That is, the angle α is given by the following expression (1)

$$\alpha=\sin^{-1}(w/2R) \quad (1)$$

The angle α thus determined gives an approximate value of an angle formed between a line "a" extended from a side of the blade 25 which is in abutment against the developing roller 21 and a line "b" tangent to a surface of the developing roller 21 at an upstream end of the nip.

An angle of aperture θ at the toner inlet portion, which angle is formed between the developing roller 21 and the blade 25, is given by the following expression (2):

$$\theta=\psi+\sin^{-1}(w/2R) \quad (2)$$

wherein ψ denotes an angle formed between the line "a" extended from the side of the blade 25 which side is in abutment against the developing roller 21 and a line "c" along the slant face 25*a* at the tip end of the blade 25.

The nip width "w" under the aforementioned conditions actually measured 1.9 mm. The measurement of the nip width "w" was performed by the steps of idling the developing apparatus 2 for a given period of time, dismounting the blade 25 and measuring a nip mark produced in the surface of the blade 25.

In Example 1, substituting the nip width "w" thus determined into the expression (1) gives the angle α of about 4.0°.

The tilt angle ψ formed at the tip end of the blade 25 was set to, for example, 9.5°, at which the slant face 25*a* at the tip end of the blade 25 was angled. This tilt angle was measured using a surface shape/roughness measuring equipment incorporating laser interferometer (S5 FORM-TALLYSURF SERIES 2 commercially available from Rank Taylor Hobson Inc). The blade 25 whose slant face 25*a* has a tilt angle of 9.5° is hereinafter referred to as "Blade structure A".

Accordingly, the angle of aperture θ formed between the developing roller 21 and the slant face 25*a* of the blade 25 in Example 1 is 13.5° from the expression (2).

Figure 3:
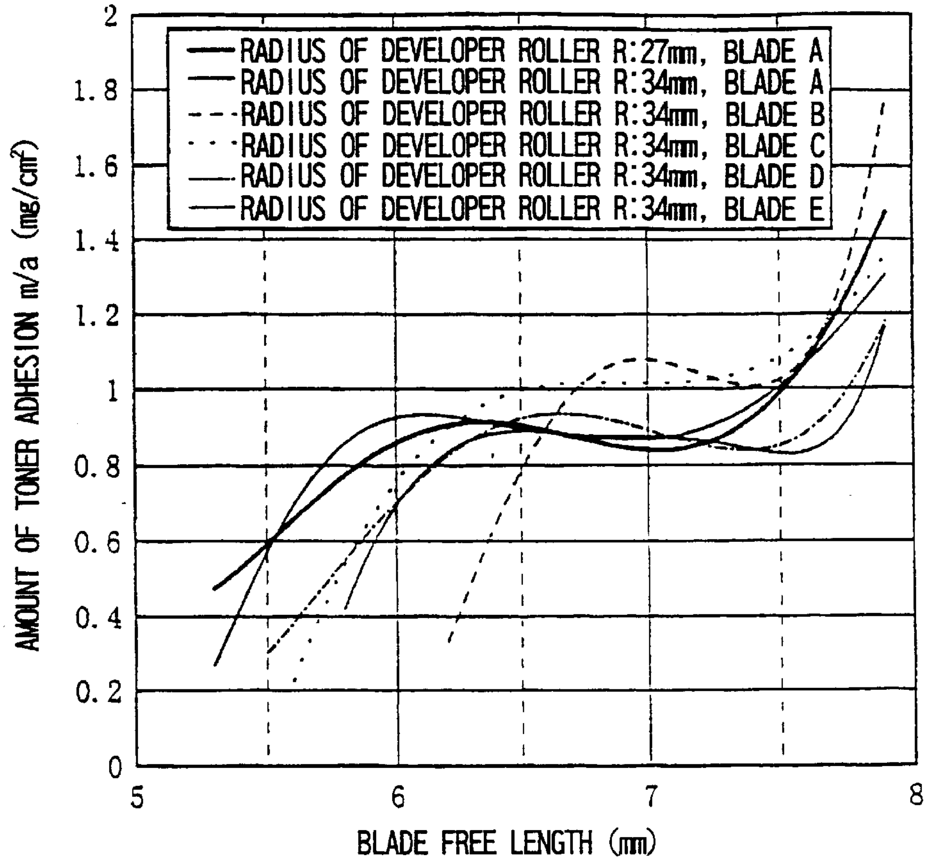
FIG. 3 is a graph representing a relation between a free length of the blade according to the invention and a toner mass per unit area (m/a) to the developing roller.

FIG. 3 shows a relation of a toner mass per unit area (m/a) on the developing roller 21 versus a free length of the blade 25 (the length l in FIG. 2) according to the blade structure A. As seen from FIG. 3, the blade 25 can maintain the toner mass per unit area m/a in the range of between 0.8 and 1.0 mg/cm$^3$ when the free length l of the blade 25 is in the range of between 5.85 and 7.55 mm. Thus a setting allowance for the free length l, that is an allowance for the setting position of the blade 25 is 1.7 mm.

Accordingly, if the angle or aperture θ formed between the tilt angle ψ of the slant face 25*a* formed at the tip end of the blade 25 and the angle α is set to a predetermined value or larger, the range of the allowance for setting of the blade 25 may be widened considerably, which gives leeway to the precision of mounting the blade and facilitates the mounting operation.

Next, the developing roller 21 is formed to have the same structure as mentioned above except that a diameter thereof is 34 mm (radius R=17 mm) and a diameter of the shaft thereof is 18 mm. The blade 25 of the aforementioned structure A is pressed against the developing roller such a diameter.

At this time, a nip width "w" at which the blade 25 is pressed against the developing roller 21 was at w=2.0 mm based on the same measurement. By using the expressions (1) and (2), the angles α and θ were determined as α=3.4°, θ=3, 4+9.5=12.9°, respectively.

FIG. 3 also shows a relation of a toner mass per unit area (m/a) on the developing roller 21 versus a free length of the blade 25 of this case. As seen from FIG. 3, the blade 25 can maintain the toner mass per unit area m/a in the range of between 0.8 and 1.0 $mg/cm^2$ when the free length l of the blade is in the range of between 6.1 and 7.5 mm. Thus the setting allowance of the free length is increased as large as 1.4 mm.

As described above, it is understood that with the blade of the same structure Λ employed, the allowance for the setting position of the blade 25 varies as the diameter of the developing roller 21 varies. It is further understood that the allowance for the setting position of the blade 25 is increased by ensuring the angle of aperture O according to the invention.

For more detailed examination, an experiment was conducted, in which the tilt angle ψ of the tip end of the blade 25 was varied to 7.1°, 9.0°, 9.8°, and 10.8°, respectively, while the developing roller 21 having the diameter of 34 mm (radius R=17 mm) and the shaft diameter of 18 mm was used. Blades with different tilt angles ψ were denoted by B, C, D and E, respectively. The blades of B to E structures all presented the nip width "w" of 2.0 mm based on the same measurement as described above. FIG. 3 also shows relations of toner masses per unit area (m/a) on the developing roller 21 versus respective free lengths of the blades 25 versus in this experiment.

Table 1 shows the results obtained where structures A to E of the blade 25, and various diameters of the developing roller 21 are used.

TABLE 1

| Radius R of developing roller (mm) | α (° ) | Blade structure | Tilt angle ψ (° ) | Angle of aperture θ at toner inlet (° ) | Allowance for free length (° ) |
|---|---|---|---|---|---|
| 27 | 4 | A | 9.5 | 13.5 | 1.7 |
| 34 | 3.4 | A | 9.5 | 12.9 | 1.4 |
| 34 | 3.4 | B | 7.1 | 10.5 | 0.2 |
| 34 | 3.4 | C | 9.0 | 12.4 | 0.4 |
| 34 | 3.4 | D | 9.8 | 13.2 | 1.6 |
| 34 | 3.4 | E | 10.8 | 14.2 | 2.1 |

Figure 4:
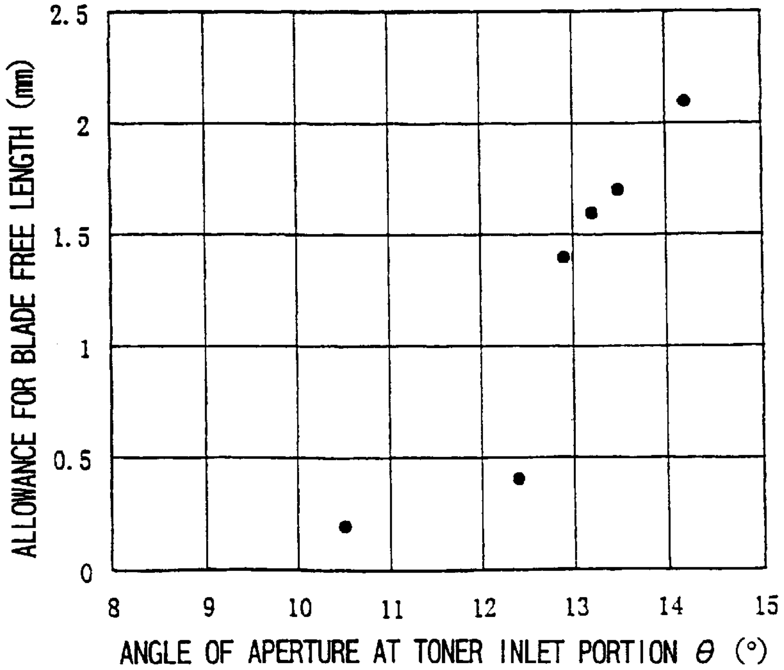
FIG. 4 is a graph representing a setting allowance for a free length of the blade of the invention with respect to an angle θ of aperture at a toner inlet portion for ensuring the toner mass per unit area.

It is apparent from Table 1 that with the angle of aperture of 12.4° or less, the setting allowance for the free length l of the blade 25 becomes almost 0. For clarifying the results shown in Table 1, the relations of the allowance for the free length l of the blade 25 versus the angle of aperture θ at the toner inlet portion is plotted in FIG. 4. As seen in FIG. 4, the allowance for the free length rapidly increases when the angle of aperture θ exceeds 12.5° whereas the allowance rapidly drops off when the angle of aperture is less than 12.5°.

As described above, when the radius R of the developing roller 21 and the tilt angle ψ at the tip end of the blade 25 are specified so as to satisfy $\theta=\psi+\sin^{-1}(w/2R)>12.5°$, wherein ψ is an angle formed between the line (a) extended from the face on which the blade 25 abuts with the developing roller 21 and the slant face (c) of the blade 25; w is the nip width on which the blade abuts with the developing roller 21; and R is the radius of the developing roller 21, an adequate allowance for the toner mass per unit area on the developing roller 21 may be ensured. In this case, it is more preferable that the angle of aperture θ is set at 13.5° or more.

It is to be noted that regarding the term "$\sin^{-1}(w/2R)$" of the above expression, the nip width w between the blade 25 and the developing roller 21 varies depending upon the elasticity of the developing roller 21. However, by setting the angle of aperture θ at the toner inlet portion to a suitable value according to the above expression, an adequate allowance for the setting position of the blade 25 for ensuring a desired toner mass per unit area can be achieved. This contributes to an increased allowance for the free length l in fabricating the blade 25. As a result, not only fabrication of the blade is facilitated, but also allowance for mounting the blade so as to be pressed against the developing roller 21 is increased, so that mounting of the blade is easily executed.

EXAMPLE 2

Example 2 is intended to examine effects of the invention based on the thickness of the blade.

Example 2 was carried out using the same structure of blade as that of Example 1 except that the thickness of the member constituting the blade 25 is set at 0.3 mm or more.

In this case, distortion due to a residual stress caused by a bending process of the blade 25 was generated, so that a warp of the order of 10 mm was produced across the overall width of about 300 mm of the blade 25.

This warp was not eliminated when one end of the blade 25 was fixed to the developing tank 20 of the developing apparatus 1 shown in FIG. 2. Consequently, the straightness of the blade 25 was deteriorated at the portion where the blade abuts with the developing roller 21. This resulted in inconsistencies in the thickness of the toner layer on the developing roller 21.

In contrast, when the thickness of the member constituting such as the blade 25 with the structure A of Example 1, is set at 0.2 mm or less, the warp resulting from the distortion due to the bending process was limited to 5 mm or less with respect to the overall width of the blade. Accordingly, when the blade was employed with being fixed to the actual developing tank 20 and being pressed against the developing roller 21, a preferable toner layer and a uniform toner mass per unit area are attained.

EXAMPLE 3

Example 3 is intended to examine effects based on selections of materials for the blade 25.

In Example 3, blades of the structure of Example 1 were formed of SUS 301-CSP of JIS G 4313 subjected to a temper of 3/4H, H or EH, SUS 304-CSP subjected to a temper of 3/4H or H, and the like. As results of using such materials, the slang face 25*a*, when formed at the tip end of the blade 25 by bending process, was formed with high precision regarding the shape thereof. In addition, the straightness of the bent portion of the blade 25 was improved so that a favorable toner layer was formed across the overall axial area of the developing roller 21.

Figure 5:
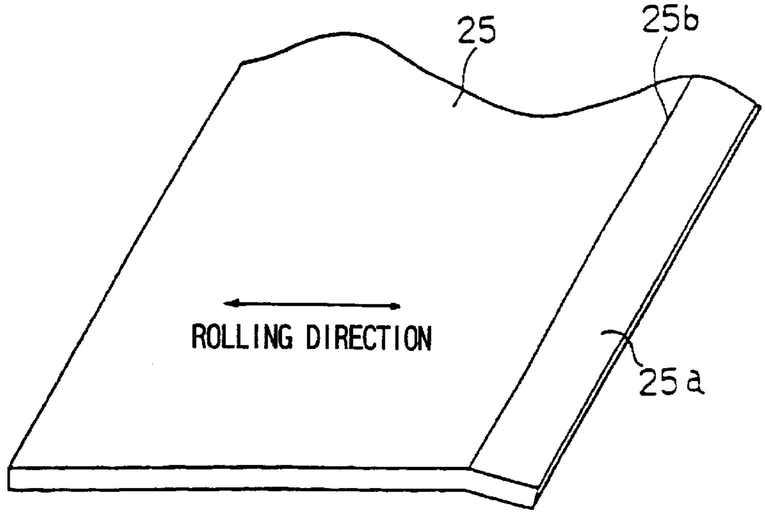
FIG. 5 is a schematic diagram showing a relation between a rolling direction and a bend direction, when a rolled material is used for forming a blade member.

FIG. 5 is a schematic diagram showing a relation between a rolling direction of a thin-sheet material and a bending direction of the same when the slant face of the tip end of the blade 25 was formed by mechanical bending. The blade 25 (FIG. 5) in which the thin-sheet material was bent so as to have a bend line 25*b* perpendicular to the rolling direction of the thin-sheet material, had an improved straightness of the bent portion and allowed a preferable toner layer to be formed across the overall axial area of the developing roller 21, compared to a blade in which bending process was carried out along a bend line 25 parallel to the roller direction of the thin-sheet material.

It is, therefore, to be concluded that when the tip end of the blade 25 is bent for forming the slant face 25*a*, the bending process is preferably carried out so that the bend line 25*b* crosses with the rolling direction of the thin-sheet material at right angles, as shown in FIG. 5.

Further, in the case where the rolled material used for the blade was subjected to a TA treatment (tension annealing treatment) prior to the bending process, the straightness of the blade 25 at the abutting portion with the developing roller 21 was improved and the toner layer was preferably formed across the overall axial area of the developing roller 21, compared to the case where the material was not subjected to the TA treatment.

EXAMPLE 4

Example 4 is intended to examine effects of the invention when the slant face 25*a* is formed at the tip end of the blade 25 in the configuration of Example 1 by a mechanical bending process.

Figure 6:
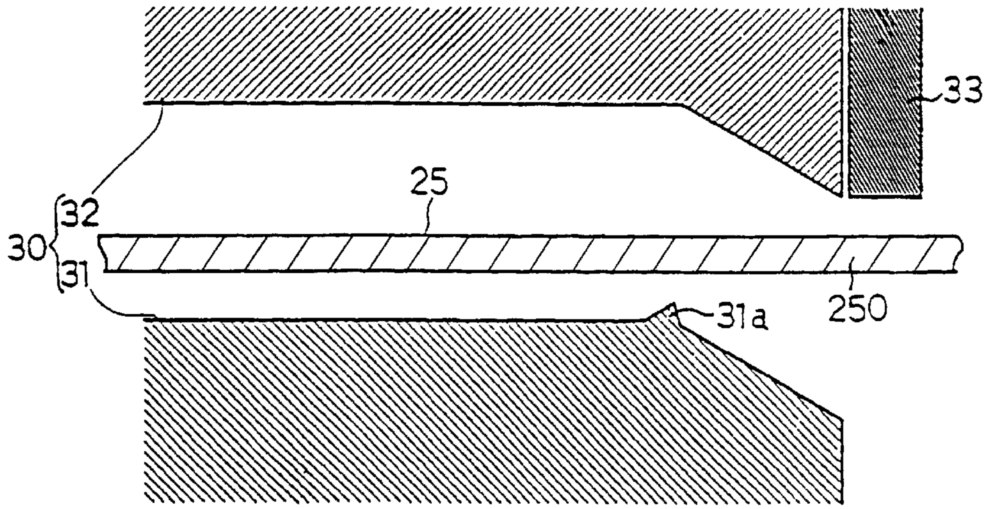
FIG. 6 is a schematic diagram of an example of a mold for forming the slant face on the blade by a mechanical bending process.

FIG. 6 shows molds employed in a bending process for forming the slant face 25*a* of the blade 25. Molds 30 of FIG. 6, on which a blade member 250 to be formed into the blade 25 is placed, have slant portions adapted to the slant face 25*a*. The molds 30 are composed of: a punching mold 31 provided with a projection 31*a* at the position corresponding to a bend portion of the blade, the projection 3*a* having a height about 0.01 to 0.02 mm; and a die mold 32 to be pressed from above.

The slant face 25*a* of the blade 25 is formed by sandwiching the blade member 250 between the punching mold 31 and the die mold 32, and thereafter applying a pressure from above the die mold 32 for press working. At the same time, the blade member 250 is cut into a predetermined length by a shearing mold 33, thereby obtaining the blade 25 of the predetermined length.

As described above, in forming the slant face 25*a* of the blade 25, the projection 31*a* of the punching mold 31 pushes the back side of the blade member 250 at the bend portion thereof, so that a spring-back occurring in the bending process is prevented, as well as a shape of the bent portion of the die 32 (shape of the slant face) may be precisely transferred to the blade member 250. This bending process did not produce cracks in the bend portion of the blade or particularly on a side thereof abutting with the developing roller 21.

With such a bending process mentioned above, the bend portion of the blade 25 is formed with a higher precision compared to the case using molds excluding a projection and a smooth bend surface is obtained. The blade 25 thus obtained enabled formation of a more preferable toner layer.

EXAMPLE 5

In the configuration of Example 1, the slant face 25*a* was formed at the tip end of the blade 25 by a mechanical bending process of different method from that of Example 4. After the formation of the slant face 25*a*, the side of the bend portion on which the blade abuts with the developing roller 21 was subjected to a grinding process, thereby obtaining a smooth bend surface. Using this blade, a preferable toner layer was formed.

The grinding process was carried out in the following steps: roughly grinding the surface with a sand paper of #300 to #450, further grinding the surface with a sand paper of #600 to #1200 and finishing the surface with an emery paper of #2000 to #5000 or a cloth applied with a compound containing alumina.

EXAMPLE 6

Example 6 is intended to examine a configuration which prevents toner from being fused to the surface on which the blade 25 abuts with the developing roller 21 and causing formation of nonuniform toner layer during an extended period of time of use, and effects attained by the configuration.

Figure 7:
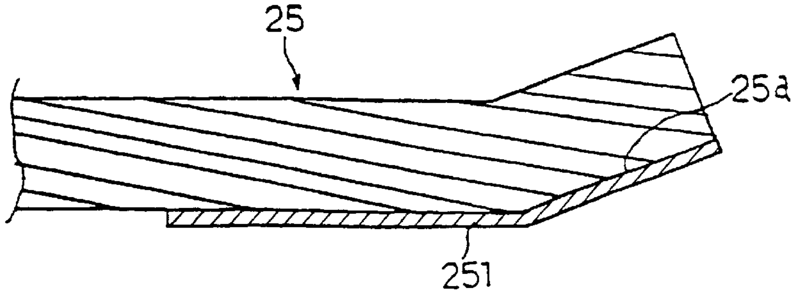
FIG. 7 is a schematic diagram showing an exemplary constitution of the blade in which a metal foil piece is stuck on a contacting face of the fabricated blade with the developing roller, thereby preventing toner fusion.

The blade 25 of Example 6 had a similar configuration to that of Example 1 and was fabricated in such a manner that following to the formation of the slant face 25*a* in the blade 25 by the mechanical bending process, an alumite-treated aluminum foil piece 251 is stuck onto the surface involving the slant face 25*a* and the surface where the blade 25 contacts with the developing roller 21 with a conductive adhesive, as shown in FIG. 7.

For comparison with this configuration, when the blade formed of phosphor bronze for spring C5210 was pressed against the developing roller 21 and an idle running test was carried out on the developing apparatus, the toner was fused to the blade surface (contact surface with the developing roller 21) after lapse of about 8 hours so that streaks were produced in the regulated toner layer.

In the blade 25 shown in FIG. 7, however, the idle running test of the developing apparatus 1 resulted that no streaks occurred in the toner layer even after 20-hours idle running.

Figure 8:
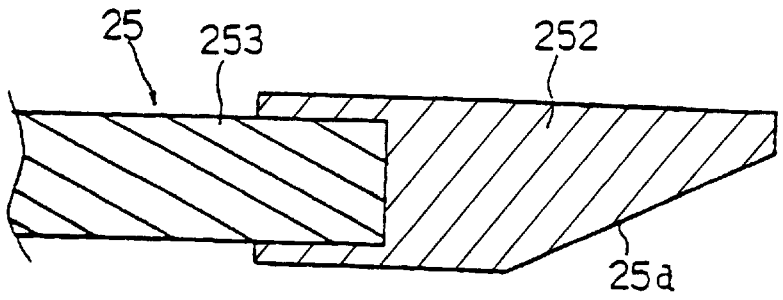
FIG. 8 is a schematic diagram showing another exemplary structure of the blade for preventing toner fusion.

Alternatively, as shown in FIG. 8, the slant face 25*a* of the blade 25 was defined by an aluminum tip 252 which was formed by die casting and the surface thereof was alumite-treated. Thereafter, the tip 252 was stuck to a blade member 253 formed of a 0.25 mm-thick phosphor bronze C5210 by the use of a conductive adhesive and thus was obtained the blade 25 shown in FIG. 8. In the blade of FIG. 8 thus fabricated, the tip 252 defined the contact surface with the developing roller 21, offering the similar effect to that of the blade shown in FIG. 7.

It is therefore concluded that when a material used for the blade 25 presents a possibility that the toner fusion may occur to form a nonuniform toner layer, the provision of the alumite-treated member is quite effective to prevent the toner fusion.

EXAMPLE 7

In Examples 1 to 6 described above, the slant face 25*a* of the blade 25 was formed particularly by bending a consideration was given to reduce influence of distortion caused by a residual stress. Further, the alumite-treated member was used for preventing the toner from fusing to the blade surface 25 in contacting relation with the developing roller 21. A process for forming a member in which a slant face is formed without such bending process and to which alumite-treatment is executed will be described in Example 7.

The blade of Example 7 has the similar configuration as that of Example 1 except that the slant face 25*a* at the tip end of the blade 25 is not formed by bending process. Instead, as shown in FIG. 9, a step 25*c* is formed at a tip end of a blade member 254, and a metal foil piece 255 is stuck so as to cover the step 25*c* for forming the slant face 25*a*, thereby forming the blade 25.

The blade member 254 is formed of a 0.1 mm-thick SUS304 steel sheet and is subject to half-etching to remove a portion on one side thereof in abutment relation with the developing roller 21, the portion having a longitudinal length of about 300 μm from the tip end of the blade member and a depth of about 50 μm. Subsequently, the 0.05 mm-thick phosphor bronze foil piece 255 is stuck onto the tip end portion with a conductive adhesive.

Because the slant face 25*a* is not formed by a mechanical bending process in the case of the blade 25 thus fabricated, the slant face 25*a* having nearly constant tilt angle ψ across the overall width of the blade and not causing a warp was achieved. Thus the forming precision was ensured in a simpler manner. In short, the blade 25 shown in FIG. 9 can eliminate the disadvantage which may occur in employing a mechanical bending process that the tilt angle is influenced by distortion due to a residual stress depending on thickness or material of the blade member 254.

Figure 9:
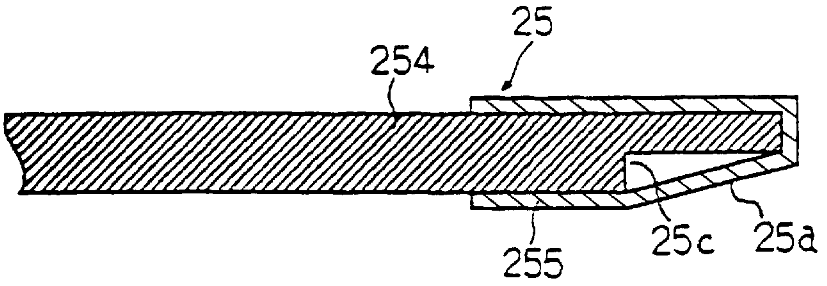
FIG. 9 is a schematic diagram showing an example that the slant face of the blade of the invention is formed without executing a mechanical bending process.
Figure 10:
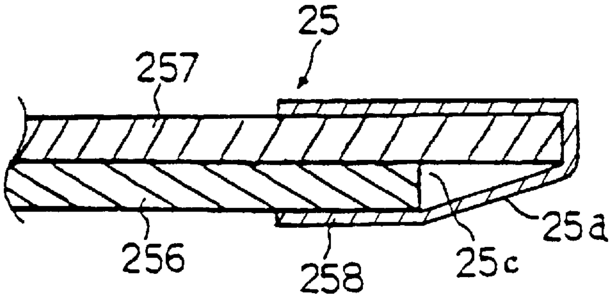
FIG. 10 is a schematic diagram showing another example that the slant face of the blade of the invention is formed without executing mechanical bending process.

The method for forming the step 25*c* at the blade member 154 is not limited to that illustrated in FIG. 9. As shown in FIG. 10, the step 25*c* may be obtained by sticking (laminating) thin sheets 256, 257, which are two blade members with different lengths of tip end, to each other. For example, two thin-sheets 256, 257 having a thickness of 0.05 mm may be stuck to each other. In this case, a depth of the step 25*c* may readily be determined by controlling the thickness of the blade member 256.

Further, in laminating the two thin-sheet blade members 256, 257, the forming precision with respect to a longitudinal length of the step 25*a* may be readily achieved by bonding or welding such as laser spot welding the members together via a positioning hole.

In addition, out of the laminated blade members 256, 257, an edge (tip end) of the shorter blade member 256 may be used as a reference line and the edge may be fit to a die to cut off an end portion of the longer blade member 257 to a desired length, such as 300 μm, thereby to form a desired step. The forming precision may readily be achieved by this method.

Similarly to the blade of FIG. 9, the 0.05 mm-thick metal foil piece such as phosphor bronze foil piece 258 may be stuck to the resultant blade member with the conductive adhesive thereby to fabricate the blade 25 formed with the slant face 25*a*.

Similarly to the foregoing examples, in the blades 25 having structures as shown in FIGS. 9 and 10, the predetermined tilt angle ψ of the slant face 25*a* is ensured, with the result that a sufficient setting freedom in mounting the blade 25 to the developing tank 20 is ensured, as well as the predetermined toner mass per unit area and a uniform toner layer are ensured. Moreover, since the blade suffers no distortion due to the bending process, the slant face 25*a* may be uniformly formed across the overall width of the blade 25, so that the forming precision thereof further increases.

The metal foil pieces 255, 258 stuck so as to cover the steps 25*c* shown in FIGS. 9 and 10 preferably have a thickness of 0.05 mm or less. If the metal foil piece 255 or the like has a thickness of 0.1 mm or more, the metal foil piece 255 or the like will not sufficiently deformed when it is stuck to the blade member, so that the slant face 25*a* with a smoothness cannot be obtained.

The metal foil pieces 255, 258 stuck to the step 25*c* may preferably be alumite-treated foil pieces such as a 0.02 mm-thick aluminum foil piece on which a 0.02 mm-thick alumite layer is formed. Such a metal foil piece presents an improved resistance to toner fusion, as described in Example 6.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A developing apparatus using one-component toner comprising:

- a developing roller for carrying and transporting one-component toner to a developing region opposing an image bearing member bearing an electrostatic latent image; and
- a blade for regulating an amount of one-component toner carried on the developing roller, wherein the blade pressed against the developing roller is formed with a slant face at a tip end thereof, the slant face being inclined so that a distance between the slant face and the developing roller is gradually reduced along a direction of incoming toner, and an abutment force of the blade and a tilt angle of the slant face of the blade are set so that an angle of aperture θ between the slant face and the developing roller in a state of being pressed against the blade is equal to or more than 12.5°, and wherein the angle of aperture θ is set by setting a radius R of the developing roller and a tilt angle ψ at the tip end of the blade so as to satisfy $\theta=\psi+\sin^{-1}(w/2R)$ where ψ denotes a tilt angle of the slant face of the blade, w denotes a nip width on which the blade contacts with the developing roller, and R denotes a radius of the developing roller.

2. The developing apparatus using one-component toner of claim 1, wherein the blade is constructed of a one-piece metal sheet-like member formed with the slant face by mechanical bending, and a thickness of the sheet-like member is equal to or less than 0.2 mm.

3. The developing apparatus using one-component toner of claim 2, wherein the slant face of the blade is formed by bending the sheet-like member constructing the blade along a bend line orthogonal to a rolling direction of the sheet-like member.

4. The developing apparatus using one-component toner of claim 2, wherein the mechanical bending for forming the slant face of the blade is carried out by using a mold provided with a projection at a position corresponding to a bend position on a side of the blade opposite to a side thereof abutting with the developing roller.

5. The developing apparatus using one-component toner of claim 1, wherein a face of the blade is ground on a side abutting with the developing roller.

6. The developing apparatus using one-component toner of claim 1, wherein alumite-treated aluminum foil is provided on at least a face of the blade which is on a side abutting with the developing roller.

7. The developing apparatus using one-component toner of claim 1, wherein the slant face of the blade is formed by a step at a tip end of the sheet-like member constructing the blade, and a metal foil piece placed over the tip end of the sheet-like member so as to cover the step formed therein.

8. The developing apparatus using one-component toner of claim 7, wherein the blade is formed of two thin-sheet members stacked together with tip ends thereof being shifted from each other for forming the step, and the metal foil piece is provided so as to cover the step.

9. A developing apparatus using one-component toner comprising:

a developing roller for carrying and transporting one-component toner to a developing region opposing an image bearing member bearing an electrostatic latent image; and a blade for regulating an amount of one-component toner carried on the developing roller, wherein the blade pressed against the developing roller is formed with a slant face at a tip end thereof, the slant face being inclined so that a distance between the slant face and the developing roller is gradually reduced along a direction of incoming toner, and an abutment force of the blade and a tilt angle of the slant face of the blade are set so that an angle of aperture θ between the slant face and the developing roller in a state of being pressed against the blade is equal to or more than 12.5°, and wherein the blade is constructed of a one-piece metal sheet-like member formed with the slant face by mechanical bending, and a thickness of the sheet-like member is equal to or less than 0.2 mm, and the mechanical bending for forming the slant face of the blade is carried out by using a mold provided with a projection at a position corresponding to a bend position on a side of the blade opposite to a side thereof abutting with the developing roller.

10. The developing apparatus using one-component toner of claim 9, wherein the angle of aperture θ is set by setting a radius R of the developing roller and a tilt angle ψ at the tip end of the blade so as to satisfy $\theta=\psi+\sin^{-1}(s/2R)$ where ψ denotes a tilt angle of the slant face of the blade, w denotes a nip width on which the blade contacts with the developing roller, and R denotes a radius of the developing roller.

11. The developing apparatus using one-component toner of claim 9, wherein the slant face of the blade is formed by bending the sheet-like member constructing the blade along a bend line orthogonal to a rolling direction of the sheet-like member.

12. The developing apparatus using one-component toner of claim 9, wherein a face of the blade is ground on a side abutting with the developing roller.

13. The developing apparatus using one-component toner of claim 9, wherein alumite-treated aluminum foil is provided on at least a face of the blade which is on a side abutting with the developing roller.

14. The developing apparatus using one-component toner of claim 9, wherein the slant face of the blade is formed by a step at a tip end of the sheet-like member constructing the blade and a metal foil piece placed over the tip end of the sheet-like member so as to cover the step formed therein.

15. A developing apparatus using one-component toner comprising:

a developing roller for carrying and transporting one-component toner to a developing region opposing an image bearing member bearing an electrostatic latent image; and a blade for regulating an amount of one-component toner carried on the developing roller, wherein the blade pressed against the developing roller is formed with a slant face at a tip end thereof, the slant face being inclined so that a distance between the slant face and the developing roller is gradually reduced along a direction of incoming toner, and wherein the slant face of the blade is formed by a step at tip end of the sheet-like member constructing the blade and a metal foil piece placed over the tip end of the sheet-like member so as to cover the step formed therein.

16. The developing apparatus using one-component toner of claim 15, wherein a face of the blade is ground on a side abutting with the developing roller.

17. The developing apparatus using one-component toner of claim 15, wherein the blade is formed of two thin-sheet members stacked together with tip ends thereof being shifted from each other for forming the step, and the metal foil piece is provided so as to cover the step.

18. The developing apparatus using one-component toner of claim 15, wherein the angle of aperture θ is set by setting a radius R of the developing roller and a tilt angle ψ at the tip end of the blade so as to satisfy $\theta=\psi+\sin^{-1}(w/2R)$ where ψ denotes a tilt angle of the slant face of the blade, w denotes a nip width on which the blade contacts with the developing roller, and R denotes a radius of the developing roller.

19. The developing apparatus using one-component toner of claim 15, wherein alumite-treated aluminum foil is provided on at least a face of the blade which is on a side abutting with the developing roller.

* * * * *